(12) United States Patent
Singh et al.

(10) Patent No.: US 12,241,333 B2
(45) Date of Patent: Mar. 4, 2025

(54) CEMENT COMPOSITION AND ITS RELATION WITH COMPRESSIVE STRENGTH

(71) Applicant: Halliburton Energy Services, Inc., Houston, TX (US)

(72) Inventors: John Paul Bir Singh, Kingwood, TX (US); Xueyu Pang, Tomball, TX (US); Krishna Babu Yerubandi, Houston, TX (US); Thomas Jason Pisklak, Cypress, TX (US); Ronnie Glen Morgan, Waurika, OK (US); Siva Rama Krishna Jandhyala, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1228 days.

(21) Appl. No.: 16/632,462

(22) PCT Filed: Apr. 5, 2019

(86) PCT No.: PCT/US2019/026167
§ 371 (c)(1),
(2) Date: Jan. 20, 2020

(87) PCT Pub. No.: WO2020/204952
PCT Pub. Date: Oct. 8, 2020

(65) Prior Publication Data
US 2021/0172280 A1     Jun. 10, 2021

(51) Int. Cl.
*E21B 33/13* (2006.01)
*C04B 7/02* (2006.01)
*C09K 8/42* (2006.01)

(52) U.S. Cl.
CPC ............ *E21B 33/13* (2013.01); *C04B 7/02* (2013.01); *C09K 8/42* (2013.01); *C04B 2201/52* (2013.01)

(58) Field of Classification Search
CPC ................................. E21B 33/13; C09K 8/42
(Continued)

(56) References Cited

U.S. PATENT DOCUMENTS

| 8,609,595 B2 | 12/2013 | Morgan et al. |
| 11,078,400 B2 | 8/2021 | Pisklak et al. |

(Continued)

FOREIGN PATENT DOCUMENTS

| CN | 103163039 | 6/2013 |
| WO | 2020204955 A1 | 10/2020 |

OTHER PUBLICATIONS

ISRWO International Search Report and Written Opinion for PCT/US2019/026167 dated Jan. 3, 2020.
(Continued)

*Primary Examiner* — William D Hutton, Jr.
*Assistant Examiner* — Ashish K Varma
(74) *Attorney, Agent, or Firm* — Thomas Rooney; C. Tumey Law Group PLLC

(57) ABSTRACT

A method for designing a cement composition may include: providing a target compressive strength and a target composition density; selecting at least one cementitious material from a plurality of cementitious materials; calculating a required amount of water to produce a cement composition with the target composition density, the cement composition comprising the water and the at least one cementitious material; calculating a compressive strength of the cement composition based at least in part on a model of compressive strength; comparing the calculated compressive strength to
(Continued)

the target compressive strength; and preparing the cement composition with the calculated compressive strength.

20 Claims, 6 Drawing Sheets

(58) Field of Classification Search
USPC .......................................................... 166/293
See application file for complete search history.

(56) References Cited

U.S. PATENT DOCUMENTS

| | | | |
|---|---|---|---|
| 11,174,198 B2 | 11/2021 | Morgan et al. | |
| 11,225,595 B2 | 1/2022 | Jimenez et al. | |
| 2008/0009976 A1* | 1/2008 | Andersen | G06F 30/13 |
| | | | 700/265 |
| 2008/0149337 A1 | 6/2008 | Kulakofsky et al. | |
| 2010/0212892 A1* | 8/2010 | Santra | C09K 8/467 |
| | | | 166/250.14 |
| 2012/0152540 A1 | 6/2012 | Patil et al. | |
| 2013/0048286 A1 | 2/2013 | Morgan et al. | |
| 2014/0116150 A1* | 5/2014 | Morgan | C04B 28/14 |
| 2015/0321953 A1* | 11/2015 | Porcherie | C04B 7/02 |
| | | | 106/713 |
| 2017/0364607 A1 | 12/2017 | Kaushik et al. | |
| 2019/0225540 A1* | 7/2019 | Morgan | C04B 28/04 |
| 2019/0358853 A1 | 11/2019 | Morgan et al. | |
| 2019/0367797 A1 | 12/2019 | Morgan et al. | |
| 2020/0332172 A1* | 10/2020 | Pisklak | C09K 8/46 |
| 2020/0332643 A1 | 10/2020 | Pisklak et al. | |
| 2020/0333318 A1 | 10/2020 | Benkley et al. | |

OTHER PUBLICATIONS

New Strength Model Based on Water-Cement Ratio and Capillary Porosity, by K. S. Pann, Tsong Yen, Choa-Wei Tang, and T.D. Lin, 2003, ACI Materials Journal, vol. 100, No. 4, pp. 311-318.

Lee, F.-H., Lee, Y., Chew, S.-H., & Yong, K.-Y. (2005). Strength and Modulus of Marine Clay-Cement Mixes. Journal of Geotechnical and Geoenvironmental Engineering, 131(2), 178-186.

Xiao, H., Shen, W., & Lee, F. H. (2017). Engineering Properties of Marine Clay Admixed with Portland Cement and Blended Cement with Siliceous Fly Ash. Journal of Materials in Civil Engineering, 29(10), 04017177.

* cited by examiner

CEMENT COMPOSITION AND ITS RELATION WITH COMPRESSIVE STRENGTH

BACKGROUND

In well cementing, such as well construction and remedial cementing, cement compositions are commonly utilized. Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory mechanical properties in a cement composition within a reasonable time period after placement in the subterranean formation. Oftentimes several cement compositions with varying additives are tested to see if they meet the material engineering requirements for a particular well. The process of selecting the components of the cement composition are usually done by a best guess approach by utilizing previous slurries and modifying them until a satisfactory solution is reached. The process may be time consuming and the resulting composition may be complex. Furthermore, the cement components available in any one particular region may vary in composition from those of another region thereby further complicating the process of selecting a correct cement composition.

BRIEF DESCRIPTION OF THE DRAWINGS

These drawings illustrate certain aspects of some of the embodiments of the present disclosure and should not be used to limit or define the disclosure

DETAILED DESCRIPTION

Figure 1:
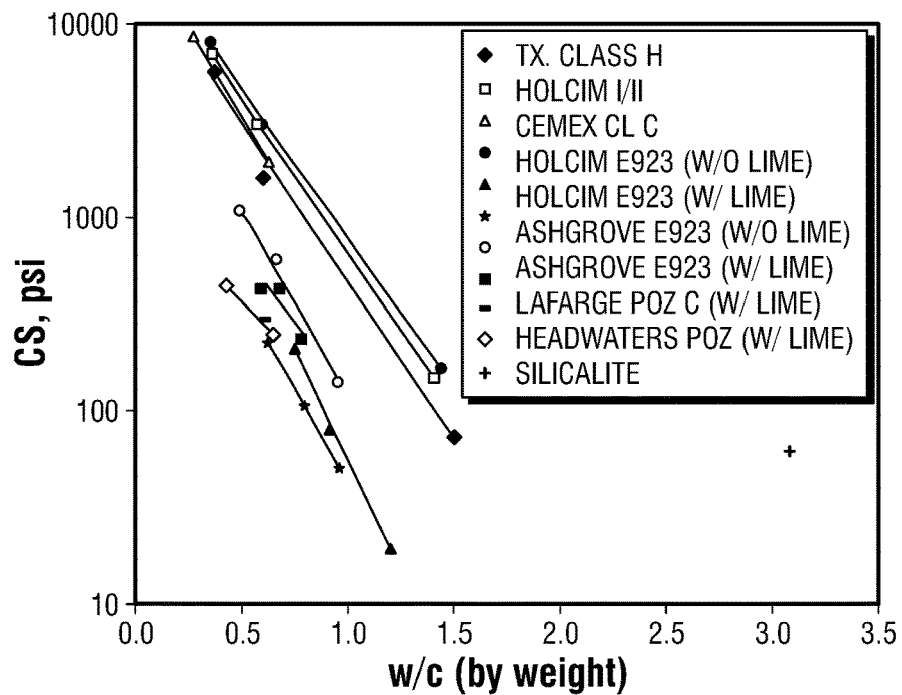
FIG. 1 is a graph of compressive strength versus water-to-cement ratio.

The present disclosure may generally relate to cementing methods and systems. Provided herein are methods that may include designing cement slurries with compressive strength. The methods may include mathematical models that relate a bulk cement composition to long term compressive strength. The methods may allow one of ordinary skill in the art, with the benefit of this disclosure, to predict the compressive strength of a cement composition and the effects on the compressive strength by adding additional components to the cement composition such as additional cementitious materials, additional water, and additional cement additives. The methods presented herein may be advantageous over traditional trial-and-error based cement composition design processes as the trial-and-error methodology, while generally effective at finding a workable cement composition, may be inefficient and time consuming and may result in a cement composition that has certain undesirable characteristics. Some undesirable characteristics may include number of components in the cement composition, concentrations of components in the cement composition, excessive compressive strength beyond engineering requirements and other parameters readily recognized by those of ordinary skill in the art. Further uses of the methods described herein may be in automation of wellbore cement composition design.

The compressive strength of a cement composition may be correlated with a mass of water to mass of cementitious material ratio (w/c). In general, two try blend cement compositions mixed with unequal amounts of water may exhibit different final compressive strengths. A cement composition prepared with relatively more water or a higher w/c ratio may have a lower final compressive strength than a cement composition prepared with relatively less water or a lower w/c ratio. The relationship between compressive strength and w/c ratio may be described by Abrams' law in Equation (1). Alternatively, Equation (1) may be rewritten in log form as in Equation (2), for example. The constants A and B may be may vary depending on the identity of the cementitious material. Constants for fly ash may not be identical to constants associated with Portland cement. Furthermore, the constants A and B may also vary depending on the source of the cementitious material as individual manufacturer processes may result in variations in mineralogical makeup of cementitious materials. For natural or mined materials such as natural glass, regional variability may result from different mines or natural source of the materials.

Equation (1) may be used to predict compressive strengths of Portland cement compositions as well as cements that do not include Portland cement. Equations (1) and (2) may also be used for cements such as pozzolanic cements, aluminate cements, geopolymer cements, and others. Equations (1) and (2) may also be used for blends of cementitious materials, such as Portland and a second cementitious material, if the interaction between the constants A and B for Portland cement and the constants A and B for the second cementitious material are known.

$$CS = \frac{A}{B^{1.5*\left(\frac{w}{c}\right)}} \quad (1)$$

$$\ln(CS) = \ln(A) - 1.5*\ln(B)*\frac{w}{c} \quad (2)$$

To demonstrate variability between different sources of cementitious materials and to test the viability of Equation (1) for cementitious materials, a series of compressive strength tests were performed using a variety of cementitious materials from different manufacturers. Cement slurries were prepared with 11 different cementitious materials and varying amounts of water-to-cement ratios. Each of the slurries included only one cementitious material and water. The water-to-cement ratios were varied between 0.5 and 1.5. Each of the slurries was cured at 140° F. (60° C.) for 7 days. A compressive strength test was performed on each of the cured cement slurries, the results of which was illustrated in FIG. 1. The compressive test results in FIG. 1 indicate that the log-linear relationship between compressive strength and w/c ratio appear to hold for tested values of w/c from 0.5 to 1.5. It may be concluded that the compressive strength is exponentially related to the mass ratio of water to cementitious material.

Figure 2:
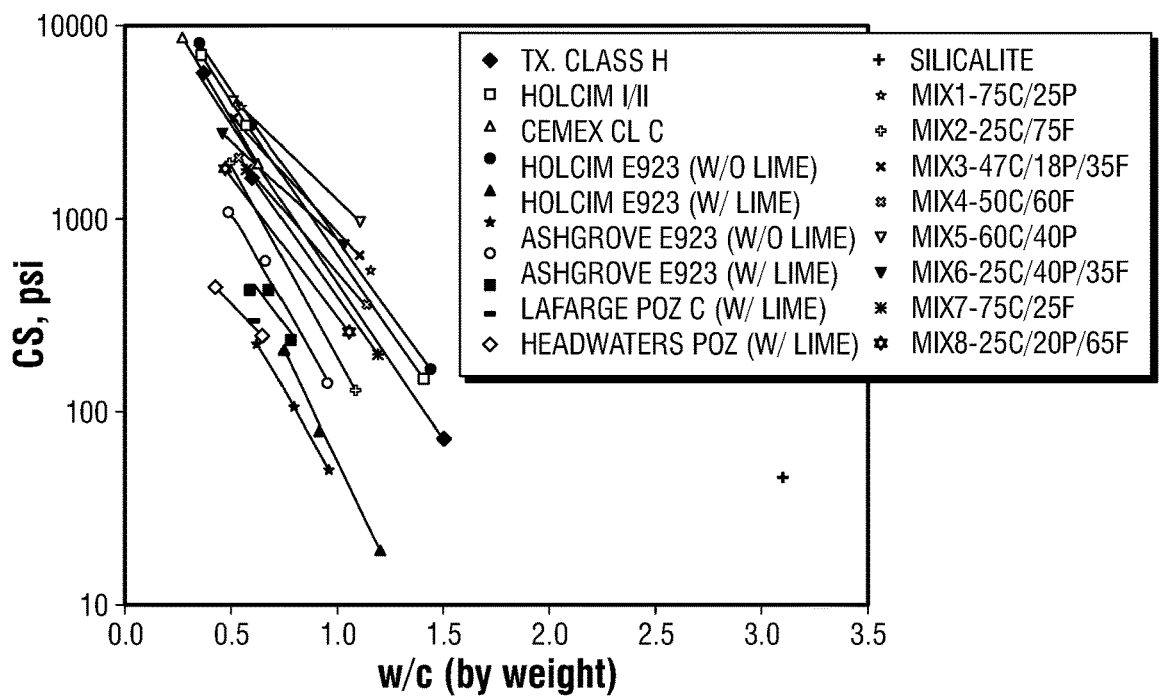
FIG. 2 is a graph of compressive strength versus water-to-cement ratio.

A second set of compressive strength tests was performed using blends of cementitious materials and water. Blends of cementitious materials were prepared by selecting cementitious materials from the group of Portland cement fly ash, silica fume, and cement kiln dust in varied weight ratios. Slurries were prepared with each of the blends of cementitious materials. The water-to-cement ratios were varied between 0.5 and 1.5. one cementitious material and water. The water-to-cement ratios were varied between 0.5 and 1.5. Each of the slurries was cured at 140° F. (60° C.) for 7 days. A compressive strength test was performed on each of the cured cement slurries, the results of which was illustrated in FIG. 2. The compressive test results in FIG. 2 indicate that the log-linear relationship between compressive strength and w/c ratio appear to hold for blends of cementitious materials tested at values of w/c from 0.5 to 1.5. It may be concluded that the compressive strength is also exponentially related to the mass ratio of water to cementitious material for blends of cementitious materials.

Power law behavior of water-to-cement ratios on compressive strength may be approximated by an exponential equation. Equation (3) is a model of compressive strength that may approximate the behavior of a cement composition as a function of $CS_0$, w/c, and a constant n. Alternatively, Equation (3) may be rewritten as Equation (4). $CS_0$ is the compressive strength obtained when water and cement are mixed in equal mass proportions (w/c=1) and n is function of various factors such as, including, but not limited to, time of cure, temperature of curing, composition of dry cement blend, and other factors. The cement in the water-to-cement ratio is any cementitious material such as fly ash, cement kiln dust, Portland cement, natural glass, and other cementitious materials that may be present in the cement composition. The water-to-cement ratio w/c can also be calculated from composition density (92 $_s$), dry blend density ($\rho_D$), and water density ($\rho_w$) as shown in Equation (5).

$$CS = CS_0\left(\frac{w}{c}\right)^n \quad (3)$$

$$\ln\left(\frac{CS}{CS_0}\right) = n*\ln\left(\frac{w}{c}\right) \quad (4)$$

$$\frac{w}{c} = \frac{1 - \frac{\rho_S}{\rho_D}}{\frac{\rho_S}{\rho_W} - 1} \quad (5)$$

Equations (2) and (5) may be combined to form Equation (6) and Equations (5) and (4) may be combined to form Equation (7).

$$\ln(CS) = \ln(A) - 1.5*\ln(B)*\frac{1 - \frac{\rho_S}{\rho_D}}{\frac{\rho_S}{\rho_W} - 1} \quad (6)$$

$$\ln\left(\frac{CS}{CS_0}\right) = n*\ln\left(\frac{1 - \frac{\rho_S}{\rho_D}}{\frac{\rho_S}{\rho_W} - 1}\right) \quad (7)$$

In each of Equations (6) and (7), there are two unknown constants A and B which should be determined for each dry blend. The constants vary with the identity of the cementitious components included in the dry blend as well as the relative weight percentages of each of the cementitious components therein. The unknown constants may be measured for each cement blend or a model may be developed that may predict the values of A and B for any cement blend. One method to develop a model for estimating the constants may be to perform a standard design of experiment (DOE) with the cementitious components that may be part of a dry blend. The DOE may result in multiple cement blends with different weight percentages of the cementitious materials and varying water-to-cement ratios. Based on the compositions derived from the DOE, a series of tests for compressive strength may be performed to gather compressive strength data for each cement blend at the w/c ratio. The compressive strength data may be input back into Equation (6) or (7) to determine the constants. Once values of A and B are known for a particular range of cement blends (i.e., varied weight ratios of cementitious components and w/c ratios), a regression model, such as a multivariate regression model, may be built using the values of A, B, and composition density as input. The regression may have the form of $CS=f(M_{C1}, M_{C2}, \ldots, M_{Cn})$, for example, where $M_{C1}$ to $M_{Cn}$ are the mass ratios of each cementitious component included in the cement dry blend. Once the regression model is built for a particular combination of cementitious materials, properties any cement composition that includes the cementitious materials can be calculated by the regression model.

Alternatively, a master equation may be written for a given set of materials using mixing rules. For an example ternary cement blend including Portland cement, fly ash, and natural glass, the compressive strength may be written as Equation (8) where CS is the compressive strength and $CS_C$, $CS_F$, and $CS_P$ are the compressive strength contributions of Portland cement, fly ash, and natural glass respectively. Equations (9), (10), and (11) are models developed to estimate the compressive strength of marine-clay cement mixtures. In Equations (9), (10), and (11), $CS_C$, $CS_F$, and $CS_P$ are the compressive strength contribution of cement, fly ash, and natural glass, $CS_{C0}$, $CS_{F0}$, and $CS_{P0}$ are the compressive strength of the cement, fly ash, and natural glass at (w/c)=1, $M_F$ is the mass fraction of fly ash, $M_P$ is the mass fraction of natural glass, $M_C$ is the mass fraction of cement, and m and n are fitted indices that reflect the effect of dry blend composition and w/c ratio on the compressive strength of the cement blend.

$$CS = CS_c + CS_F + CS_P \tag{8}$$

$$CS_c = CS_{C0}\left(\frac{\exp\left(m * \frac{M_F + M_P}{M_C}\right)}{\left(\frac{w}{c} * \frac{1}{M_C}\right)^n}\right) \tag{9}$$

$$CS_F = CS_{F0}\left(\frac{\exp\left(m * \frac{M_C + M_P}{M_F}\right)}{\left(\frac{w}{c} - 0.4 M_C\right) * \left(\frac{1}{M_F}\right)^n}\right) \tag{10}$$

$$CS_P = CS_{P0}\left(\frac{\exp\left(m * \frac{M_C + M_F}{M_P}\right)}{\left(\left(\frac{w}{c} - 0.4 M_C\right) * \frac{1}{M_P}\right)^n}\right) \tag{11}$$

Figure 3:
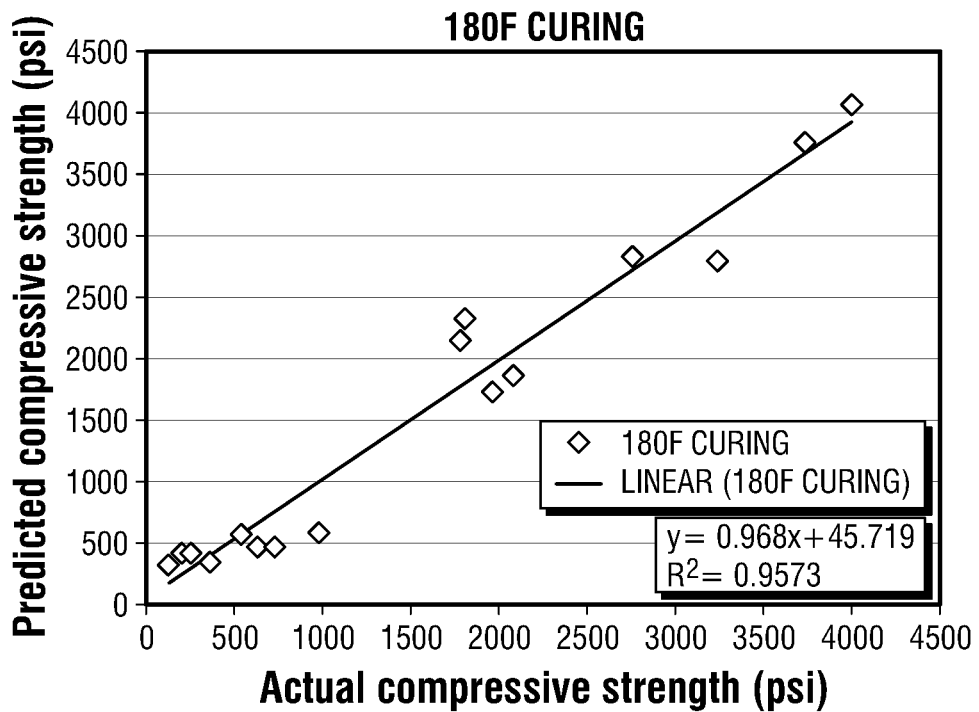
FIG. 3 is a graph of predicted compressive strength versus actual compressive strength.

As will be illustrated further in the Example section below, experimental data presented in Table 2 was used to fit the model parameters of Equations (8)-(11). The following best-fit values were found for the unknown variables: $CS_{Co}$=800 psi (5,515 kPa), $CS_{F0}$=301 psi (2,075 kPa), $CS_{P0}$=822 psi (5,667 kPa), m=0.342, and n=1.96. The cement compositions of Table 1 were prepared, cured, and tested according to the procedure outlined in the Examples section. Compressive strength data gathered from the testing was compared against the model predictive data from Equations (8)-(11) with the constants derived from the test data. FIG. 3 illustrates the model predicted compressive strength versus the actual observed compressive strength. A coefficient of determination is calculated as $R^2$=0.9573 which indicates a highly linear relationship between the model predictive compressive strength results and observed compressive strength for the cement compositions. One of ordinary skill in the art, with the benefit of this disclosure, would readily recognize how the above compressive strength models may be manipulated for cement compositions that include other cementitious materials of similar chemical makeup.

Another model for predicting compressive strength may be expressed in Equation (12) and (13). In Equations (12) and (13), $CS_0$ is the compressive strength of a Portland cement composition where w/c=1, and w/$c_{eff}$ is the effective water to cement material ratio. The effective water-to-cement ratio may account for material differences such as differences in reactivities between cementitious materials in the cement composition. For example, if a cementitious material is more reactive than Portland cement, the final compressive strength of a composition including Portland cement the more reactive cementitious material would be greater than that of Portland cement alone. $C_{eff}$ may be calculated from Equation (13) wherein $c_{cement}$ is the mass fraction of Portland cement in the dry blend, $\alpha_i$ is the reactivity index of component i, $c_i$ is the mass fraction of cementitious component i in the dry blend. For values of $\alpha$ greater than unity, the cement component is more reactive and therefore the cement component would enhance the compressive strength beyond what can be achieved using Portland cement alone. For values of $\alpha$ less than unity, the addition of the material to the cement composition would decrease the compressive strength as compared to adding Portland cement or a component with $\alpha$ greater than unity. Methods of determining $\alpha$ will be discussed in detail below.

$$CS = CS_0\left(\frac{w}{c_{eff}}\right)^n \tag{12}$$

$$c_{eff} = c_{cement} + \Sigma\ \alpha_i c_i \tag{13}$$

Figure 4:
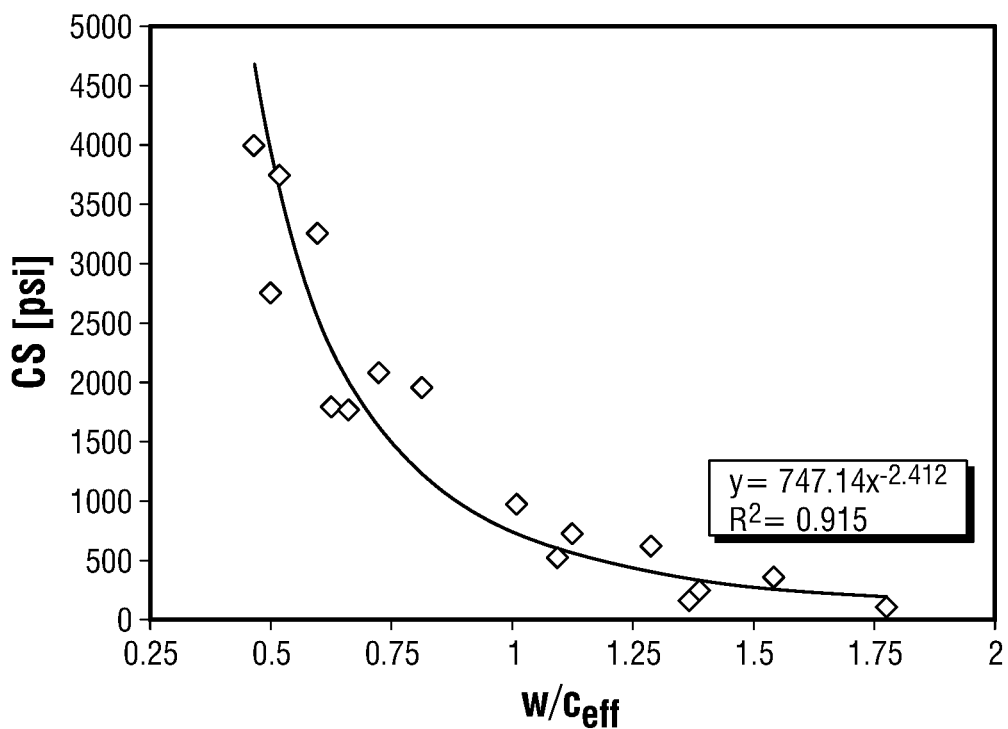
FIG. 4 is a graph of predicted compressive strength versus actual compressive strength.

FIG. 4 illustrates the observed compressive strength versus w/$C_{eff}$ from Table 2 overlaid with a line from model Equations (12) and (13). It can be observed that the model fits the observed compressive strength with a coefficient of determination calculated as $R^2$=0.915.

Figure 5A:
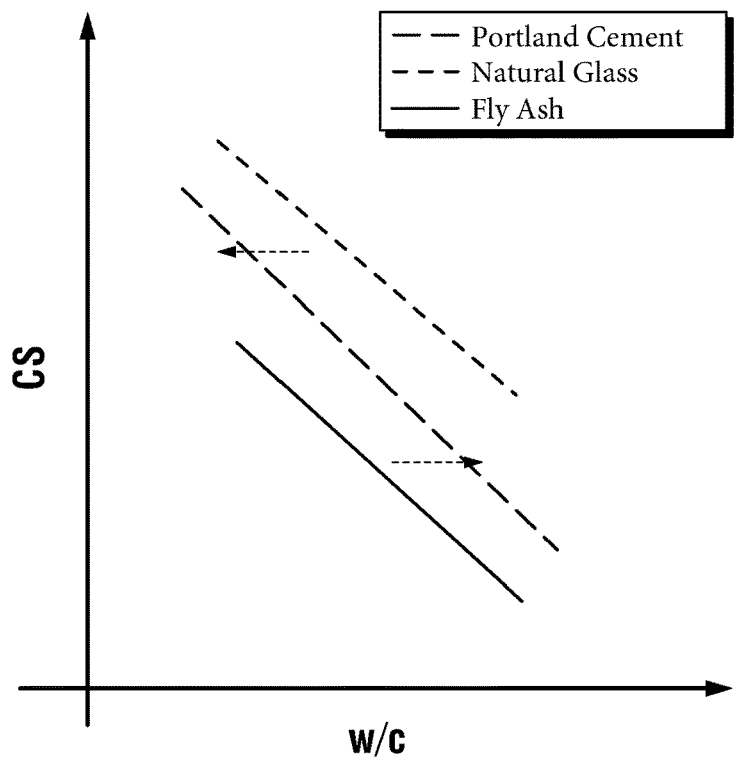
FIG. 5a is a schematic illustrating the compressive strength effects of natural glass, Portland cement, and fly ash alone.
Figure 5B:
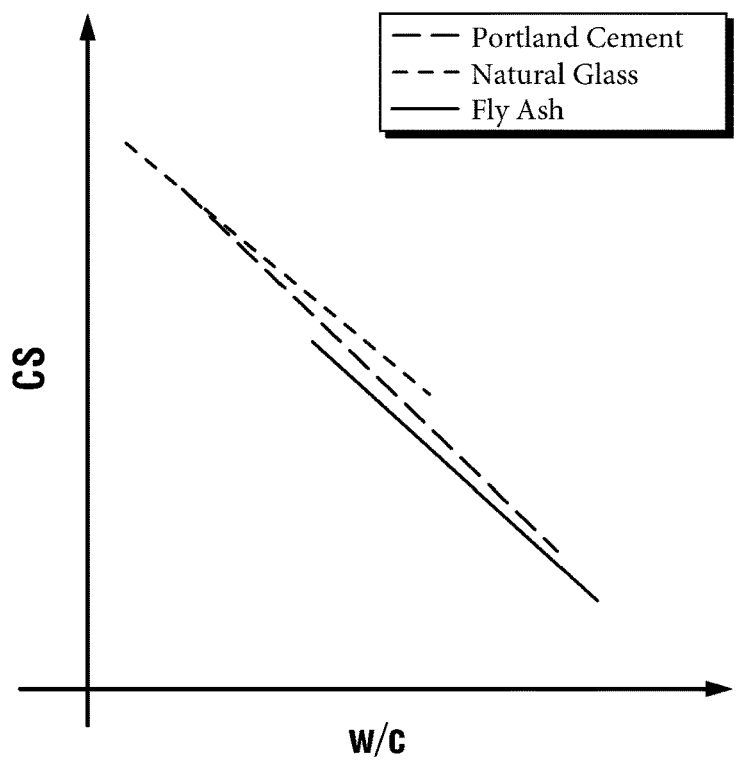
FIG. 5b is a schematic illustrating the compressive strength effects of natural glass, Portland cement, and fly ash in combination.

FIGS. 5a and 5b are schematic diagrams illustrating the effects of compositions including Portland, natural glass, and fly ash. In FIG. 5a, the compressive strength versus water-to-cement ratio is illustrated for pure Portland cement, natural glass, and fly ash. The arrows indicate the modeling approach which shifts the curves based on the dry blend composition. FIG. 5b illustrates the expected curve after the model is applied.

A method for designing a cement composition with a compressive strength and composition requirement will be described. Compressive strength requirement (kPa at a given temperature and pressure) and composition density requirement are generally known parameters. Sometimes composition density requirement may be referred to as a target composition density when the methods described herein are applied to design a cement composition. Oftentimes, a design safety factor may be added to the compressive strength requirement to ensure that the cement does not pre-maturely fail or to meet customer or regulatory requirements. The safety-adjusted compressive strength may be referred to as the design target for compressive strength. As previously discussed, a field location may have various types of manufactured and natural cement components available to include in a cement composition. A reactivity index may be calculated for each cement component using techniques described herein. A cement composition may be proposed that meets the composition density requirement. One of ordinary skill in the art, with the benefit of this disclosure, will be readily able to calculate a composition density from a proposed composition. The predicted composition compressive strength may be evaluated using any of the model equations listed herein such as Equations (6), (8), or (12). If the predicted composition compressive strength does not meet the design target compressive strength, the composition may be adjusted, such as by including more of a material with a higher reactivity index or including more of a material with a lower specific gravity to reduce the water requirement. In the instance where the predicted compressive strength is too high, the composition may be adjusted by lowering an amount of material with a higher reactivity index to reduce the overall reactivity or include a material with a relatively higher specific gravity to increase the total amount of water. The compressive strength of the new composition may then be calculated and compared to the design target for compressive strength. The method may be repeated until a cement composition is found that meets all requirements. The method may alternatively be described as providing a target compressive strength and a target composition density, selecting at least one cementitious material from a plurality of cementitious materials, calculating a required amount of water to produce a cement composition with the target composition density, the cement composition comprising the water and the at least one cementitious material, calculating a compressive strength of the cement composition based at least in part on a model of compressive strength, comparing the calculated compressive strength to the target compressive strength, and preparing the cement composition with the calculated compressive strength.

Reactivity mapping may be used to estimate various mechanical properties of a cement component, including compressive strength, tensile strength, and Young's modulus. As previously described, correlations may be made between specific surface area and certain mechanical properties, such as reactivity, tensile strength, and Young's modulus. Using these correlations the mechanical properties for a cement component or combination of cement components may be predicted.

One technique that may be used to correlate material properties to a reactivity index is modeling using a multilinear regression model. Without being limited by theory, the reactivity index ($a$) of a cement component may be referred to as a measure of the cement component's reactivity as adjusted for differences in specific gravity, bulk density, water requirement, and amount of inorganic species such as $SiO_2$ and CaO. In an embodiment, a multilinear model of chemical reactivity index for a particular material may be expressed as Equation (14).

$$\text{reactive index} = \Sigma a_i p_i \tag{14}$$

Where $a_i$ is a constant and $p_i$ is a measurable physicochemical property. $P_i$ may be any of the following physicochemical properties such as without limitation, specific gravity, bulk density, water requirement, particle size, particle size distribution, hausner ratio, particle shape parameters, aspect ratio of the particle, specific surface area, solubility in an alkaline media, oxide content such as silica, calcium oxide, alumina, iron oxide, manganese oxide, zinc oxide, and amorphous phase silica, for example. In a particular embodiment, a model of chemical reactivity index may have the form of Equation (15).

$$\alpha_i = a + b*SG + c*BD + d*WR + e*Si + f*Ca \tag{15}$$

Where a, b, c, d, e, and f are constants, SG is the specific gravity, BD is the bulk density, WR is water requirement, Si is the mass percentage of $SiO_2$ and Ca is the mass percentage of CaO.

In alternate embodiments, the model of chemical reactivity index may have the form of Equation (16), Equation (17), or Equation (18) where $a_i$ and $b_i$ are constants and $p_i$ is a measurable physicochemical property.

$$\text{reactive index} = \Sigma a_i p_i^{b_i} \tag{16}$$

$$\text{reactive index} = \Pi p_i^{a_i} \tag{17}$$

$$\text{reactive index} = \Sigma f(p_i) \tag{18}$$

A method of applying the reactivity index model may include analyzing each of a group of inorganic particles to generate data about physicochemical properties of each of the inorganic particles and thereafter generating a correlation between a reactivity index of each of the inorganic particles and the data. The correlation may then be used to design a cement composition based at least in part on the correlation. For example, the correlation may be used to select cement components and ratios thereof such that a cement composition including the selected cement components and ratios thereof has a desired reactivity. In an embodiment, a reactivity may be specified and the model may be used to determine the required cement components and ratios thereof to achieve the desired reactivity.

Another method of applying a reactivity index model may be to use a computer system and analytical instrument to gather physicochemical data about a group of inorganic particles. The computer system may then generate a correlation between a reactivity index of each of the inorganic particles and the data and then output a cement composition based at least in part on the correlation. The cement composition may be subject to certain restraints such as compressive strength, for example. A user may enter a desired compressive strength and/or a list of inorganic particles into the computer system which may then use a correlation to generate a cement composition that meets the desired compressive strength. The cement composition may include one or more of the inorganic particles in the list of inorganic particles. In an embodiment, the computer system may include a predictive model database including multiple correlations wherein each correlation is specific to a particular inorganic particle.

One technique that may be used to correlate reactivity and specific surface area is the reactivity index. surface area. It is important to note that the term "cement component" refers to any material that is cementitious when mixed with water and/or lime and a suspending agent, when necessary, such that the composition is stable. A "cementitious reactivity index" $CRI_i$ can be defined as, but not limited to, Equation (19) as follows:

$$CRI_i = f_{CRI}(CS_i, \rho_i, SSA_{PSDi}, ) \tag{19}$$

Where:
$CS_i$=Unconfined UCS (ultimate compressive strength) obtained from samples cured at specific reference temperature, pressure and age.
$\rho_i$=Density of composition that was prepared and cured for measuring UCS
$SSA_{PSDi}$=Specific surface area obtained by typical particle size analysis methods.

A "physicochemical index" (PCI) of the cementitious component may be defined as, but not limited to Equation (20):

$$PCI_i = f_{PCI}(SA_i, SG_i, D_{50}, C_{Si}, C_{Ca}, C_{Al}, C_{Na}, C_{Fe}, C_{other\ species}) \tag{20}$$

Where:
$SA_i$=Surface area of the cementitious component i,
$SG_i$=specific gravity of the cementitious component i,
$D_{50}$=mass average or volume average diameter of the particle size distribution of cementitious component i,
$C_{si}$=Mass concentration of silica oxide of component i,
$C_{Ca}$=Mass concentration of calcium oxide of component i,
$C_{Al}$=Mass concentration of Aluminum oxide of component i,
$C_{Na}$=Mass concentration of sodium oxide of component i,
$C_{Fe}$=Mass concentration of iron oxide of component i, It should be noted that the mass concentrations referenced above and here to for, may be measured, but is not limited to X-ray fluorescence spectroscopy measuring technique and a reference to "component i" is equivalent to "cementitious component i". The functions in Equations (19) and (20) that define $CRI_i$ and $PCI_i$, when properly defined, the following universal relationship may hold for a wide range of cementitious materials such as, but not limited to, Portland cements; fly ash; other pozzolanic materials; other ashes; etc.

$$CRI_i = f_{CRI-PCI}(PCI_i) \tag{21}$$

In some examples, the form of Equation (21) may be a power law, such as in Equation (22).

$$CRI_i = A\{PCI_c\}^B \quad (22)$$

A and B are coefficients that may be unique the various species and sources of cementitious materials selected. Once the generalized function defined in Equation (22) is defined for a given population or group of cementitious components, a linear or nonlinear summation relationship further defined below, may be used in conjunction with Equation (23) to predict the unconfined compressive strength of various combinations of cementitious materials for specified composition densities, temperatures, pressures and curing age.

$$CRI_c = A\{PCI_c\}^B \quad (23)$$

Where, $CRI_c$ is defined as the CRI for the unique combination of n cementitious components as the composite, and similarly $PCI_c$ is defined as the Physicochemical Index for the composite.

A given composite with mass of $m_c$ is defined as:

$$m_c = f_i + f_{i+1} + f_{i+2} + f_n \quad (24)$$

Where: $f_i$ is defined as the mass fraction of the cementitious component i, and n is the total number of independent cementitious components. Once the function is defined in Equation (21), then the composite value of the physicochemical reactivity index may be computed using Equation (25) as follows:

$$PCI_c = f_1 PCI_1 + f_2 PCI_2 + f_3 PCI_3 + \ldots + f_n PCI_n \quad (25)$$

Where: $PCI_c$ is defined as the overall chemical reactivity index for a blend of n number of uniquely independent cementitious components, $f_i$ is defined as the mass fraction of the cementitious component i, and n is the total number of independent cementitious components. Once $PCI_c$ has been determined for specific assumed blend of selected cementitious components, then the linear or non-linear summations (Equations (26) and (27)) are determined for the following terms:

$$\rho_c = f_1 \rho_1 + f_2 9 2_{\,2} + f_3 \rho_3 + \ldots + f_n \rho_n \quad (26)$$

and, $$SSA_{PSDc} = f_1 SSA_{PSD1} + f_2 SSA_{PSD2} + f_3 SSA_{PSD3} + \ldots + f_n SSA_{PSDn} \quad (27)$$

$PCI_c$ may be used to compute the value of $CRI_c$ using either Equation (22) or the more generalized form of Equation (20) for the composite terms. Once $CRI_c$ is determined for the given composite blend, then the composite values of $\rho_c$ and $SSA_{PSDc}$ may be used along with Equation (28) to predict the actual compressive strength of the composite blend, $CS_c$.

$$CRI_c = f_{CRI}(CS_c, \rho_c, SSA_{PSDc}) \quad (28)$$

Equations (19) through (28) may also be used for predicting other mechanical properties, including but not limited to, Young's Modulus of Elasticity and Tensile Strength. Additionally, it should be noted that even though a "linear summation" technique is presented in the previous development, that embodiments also include other methods such as the non-linear summation method presented in Equation (29).

$$PCI_c = (1+f_1)^{a_1} PCI_1 + (1+f_2)^{a_2} PCI_2 + (1+f_3)^{a_3} PCI_3 + \ldots + (1+f_n)^{a_n} PCI_n \quad (29)$$

Where: ai are exponents that are determined for a unique set of cementitious components.

The reactivity of a cement composition may be affected by wellbore temperature. If a wellbore has a relatively low temperature, a component having a relatively higher reactivity may be required to ensure that the cement composition develops adequate strength. In previous cement compositions, a chemical accelerator may have been used to enhance the reaction speed in a relatively lower temperature well. A cement composition including a relatively higher chemical reactivity index component may not require an accelerator due to the high reactivity of the component. Cement compositions comprising a high reactivity component may not require an accelerator and therefore may have a lower overall complexity. If a wellbore has a relatively high temperature, the cement component may be selected to have a relatively lower reactivity. Selecting a lower reactivity may be advantageous when the high temperature of a wellbore may cause the cement composition to set too quickly. In previous cement compositions, a cement set retarder may have been used to reduce the reaction speed in a relatively higher temperature well. By selecting a relatively lower reactivity component, the cement set reaction may potentially be slowed without the use of a retarder. Selecting an appropriate cement component based on reactivity may reduce the complexity of the cement composition by eliminating or reducing the need for accelerators and retarders. Furthermore, a combination of cement components may be blended to control the reactivity, for example by adding low, medium, and high reactivity cement components, a cement composition may be created that has a controlled reactivity along the spectrum of wellbore temperatures. One of ordinary skill in the art, with the benefit of this disclosure, would recognize the appropriate amount and type of cement component to include for a chosen application.

The cement compositions described herein may include water and at least one cement component. The cement compositions may have a density suitable for a particular application. The cement compositions may have any suitable density, including, but not limited to, in the range of about 8 pounds per gallon ("ppg") (959 kg/m³) to about 20 ppg (2397 kg/m³). The water used in the cement compositions may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement composition. The water may be included in an amount sufficient to form a pumpable composition. The water may be included in the cement compositions in any suitable range, including, but not limited to, in the range of about 40% to about 200% by weight of the cement component or components ("bwoc"). By weight of cement refers to the total weight of all cement components included in the cement composition. In some examples, the water may be included in an amount in the range of about 40% to about 150% bwoc.

The cement composition may include a hydraulic cement. A variety of hydraulic cements may be utilized in accordance with the present disclosure, including, but not limited to, those including calcium, aluminum, silicon, oxygen, iron, and/or sulfur, which set and harden by reaction with water. Suitable hydraulic cements may include Portland cements, gypsum, and calcium aluminate cements, among others. Portland cements may be classified as Classes A, C, G, and H cements according to American Petroleum Institute, API Specification for Materials and Testing for Well Cements, API Specification 10, Fifth Ed., Jul. 1, 1990. In addition, in some examples, cements suitable for use may be classified as ASTM Type I, II, or III. Where present, the hydraulic cement generally may be included in the cement compositions in an amount sufficient to provide the desired compressive strength and/or density.

The hydraulic cement may be present in the cement compositions in any suitable amount, including, but not limited to, in the range of about 0% to about 99% bwoc. In some examples the hydraulic cement may be present in an amount ranging between any of and/or including any of about 1%, about 5%, about 10%, about 20%, about 40%, about 60%, about 80%, or about 90% bwoc. In addition, the cement compositions may also be designed that are free (or essentially free) of Portland cement. Those of ordinary skill in the art, with the benefit of this disclosure, would be able to select an appropriate amount of hydraulic cement for a particular application.

The cement composition may include a geopolymer cement, which may include an aluminosilicate source, a metal silicate source, and an activator. The geopolymer cement may react to form a geopolymer. A geopolymer is an inorganic polymer that forms long-range, covalently bonded, non-crystalline networks. Geopolymers may be formed by chemical dissolution and subsequent re-condensation of various aluminosilicates and silicates to form a 3D-network or three-dimensional mineral polymer. The activator for the geopolymer cement may include, but is not limited to, metal hydroxides, chloride salts such as KCl, $CaCl_2$, NaCl, carbonates such as $Na_2CO_3$, silicates such as sodium silicate, aluminates such as sodium aluminate, and ammonium hydroxide. The aluminosilicate source for the geopolymer cement may include any suitable aluminosilicate. Aluminosilicate is a mineral including aluminum, silicon, and oxygen, plus counter-cations. There are potentially hundreds of suitable minerals that may be an aluminosilicate source in that they may include aluminosilicate minerals. The metal silicate source may include any suitable metal silicate. A silicate is a compound containing an anionic silicon compound. Some examples of a silicate include the orthosilicate anion also known as silicon tetroxide anion, $SiO_4^{4-}$ as well as hexafluorosilicate $[SiF_6]^{2-}$. Other common silicates include cyclic and single chain silicates which may have the general formula $[SiO_{2+n}]^{2n-}$ and sheet-forming silicates $([SiO_{2.5}]^-)_n$. Each silicate example may have one or more metal cations associated with each silicate molecule. Some suitable metal silicate sources and may include, without limitation, sodium silicate, magnesium silicate, and potassium silicate. Where present, the geopolymer cement generally may be included in the cement compositions in an amount sufficient to provide the desired compressive strength and/or density. The geopolymer cement may be present in the cement compositions in any suitable amount, including, but not limited to, an amount in the range of about 0% to about 99% bwoc. In some examples the geopolymer cement may be present in an amount ranging between any of and/or including any of about 1%, about 5%, about 10%, about 20%, about 40%, about 60%, about 80%, or about 90% bwoc. One of ordinary skill in the art, with the benefit of this disclosure, would be able to select an appropriate amount of geopolymer cement for a particular application.

The cement compositions may include a silica source. Silica may also be referred to as silicon dioxide ($SiO_2$). By inclusion of a silica source, a different path may be used to arrive at a similar product as from Portland cement. For example, a pozzolanic reaction may be induced wherein silicic acid ($H_4SiO_4$) and portlandite ($Ca(OH)_2$ react to form a cement product (calcium silicate hydrate). If other compounds, such as, aluminate, are present in the silica source, additional reactions may occur to form additional cement products, such as calcium aluminate hydrates. Additionally, alumina (aluminum oxide Al2O3) may be present in the silica source. Calcium hydroxide necessary for the reaction may be provide from other cement components, such as Portland cement, or may be separately added to the cement composition. Examples of suitable silica sources may include fly ash, slag, silica fume, crystalline silica, silica flour, cement kiln dust ("CKD"), metakaolin, diatomaceous earth, zeolite, shale, and agricultural waste ash (e.g., rice husk ash, sugar cane ash, and bagasse ash), among other. Where present, the silica source generally may be included in the cement compositions in an amount sufficient to provide the desired compressive strength and/or density. The silica source may be present in the cement compositions in any suitable amount, including, but not limited to an amount in the range of about 0% to about 99% bwoc. In some examples the silica source may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of silica source for a particular application.

The cement compositions may include fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash includes both silica and lime, so it may set to form a hardened mass upon mixing with water. Class F fly ash generally does not contain a sufficient amount of lime to induce a cementitious reaction, therefore, an additional source of calcium ions is necessary for a set-delayed cement composition including Class F fly ash. In some embodiments, lime may be mixed with Class F fly ash in an amount in the range of about 0.1% to about 100% by weight of the fly ash. In some instances, the lime may be hydrated lime. The fly ash may be present in the cement compositions in any suitable amount, including, but not limited to an amount in the range of about 0% to about 99% bwoc. In some examples the fly ash may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of fly ash for a particular application.

The cement compositions may include slag. Slag is generally a by-product in the production of various metals from their corresponding ores. By way of example, the production of cast iron can produce slag as a granulated, blast furnace by-product with the slag generally including the oxidized impurities found in iron ore. Slag generally does not contain sufficient basic material, so slag cement may be used that further may include a base to produce a settable composition that may react with water to set to form a hardened mass. Examples of suitable sources of bases include, but are not limited to, sodium hydroxide, sodium bicarbonate, sodium carbonate, lime, and combinations thereof. The slag may be present in the cement compositions in any suitable amount, including, but not limited to an amount in the range of about 0% to about 99% bwoc. In some examples the slag may be present in an amount ranging between any of and/or including any of about 1%, about 5%, about 10%, about 20%, about 40%, about 60%, about 80%, or about 90% bwoc.

Those of ordinary skill in the art, with the benefit of this disclosure, would be able to select an appropriate amount of slag for a particular application.

The cement compositions may include cement kin dust or "CKD." CKD refers to a partially calcined kiln feed which is removed from the gas stream and collected, for example, in a dust collector during the manufacture of cement. Usually, large quantities of CKD are collected in the production of cement that are commonly disposed of as waste. The CKD may be present in the cement compositions in any suitable amount, including, but not limited to an amount in the range of about 0% to about 99% bwoc. In some examples the CKD may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of CKD for a particular application.

The cement compositions may include natural glass. Certain volcanic rocks may exhibit cementitious properties, in that it may set and harden in the presence of hydrated lime and water. Natural glass be present in the cement compositions in any suitable amount, including, but not limited to an amount in the range of about 0% to about 99% bwoc. In some examples the natural glass may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of natural glass for a particular application.

Clays may be included in the cement compositions. Some clays may include shale or metakaolin. Among other things, clays included in the cement compositions may react with excess lime to form a suitable cementing material, for example, calcium silicate hydrate. A variety of clays are suitable, including those including silicon, aluminum, calcium, and/or magnesium. An example of a suitable shale includes vitrified shale. Zeolites may also be included in the cement compositions. Zeolites generally are porous alumino-silicate minerals that may be either a natural or synthetic material. Synthetic zeolites are based on the same type of structural cell as natural zeolites, and may include aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples including zeolite may include zeolite in combination with a cation such as $Na^+$, $K^+$, $Ca^{2+}$, $Mg^{2+}$, etc. Zeolites including cations such as sodium may also provide additional cation sources to the cement composition as the zeolites dissolve. The clays and zeolites may be present in the cement compositions in any suitable amount, including, but not limited to an amount in the range of about 0% to about 99% bwoc. In some examples the clays and zeolites may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of clays and/or zerolite for a particular application.

The cement compositions may further include hydrated lime or calcium hydroxide. In some examples, the hydrated lime may be provided as quicklime (calcium oxide) which hydrates when mixed with water to form the hydrated lime. The hydrated lime may be included in examples of the cement compositions. Where present, the hydrated lime may be included in the cement compositions in an amount in the range of from about 10% to about 100% by weight of the silica source, for example. In some examples, the hydrated lime may be present in an amount ranging between any of and/or including any of about 10%, about 20%, about 40%, about 60%, about 80%, or about 100% by weight of the silica source. One of ordinary skill in the art, with the benefit of this disclosure, would recognize the appropriate amount of hydrated lime to include for a chosen application.

In some examples, the cement compositions may include a calcium source other than hydrated lime. In general, calcium and a high pH, for example a pH of 7.0 or greater, may be needed for certain cementitious reactions to occur. A potential advantage of hydrated lime may be that calcium ions and hydroxide ions are supplied in the same molecule. In another example, the calcium source may be $Ca(NO_3)_2$ or $CaCl_2$ with the hydroxide being supplied form NaOH or KOH, for example. One of ordinary skill would understand the alternate calcium source and hydroxide source may be included in a cement composition in the same way as hydrated lime. For example, the calcium source and hydroxide source may be included in a silica source-to-hydrated-lime weight ratio of about 10:1 to about 1:1 or a ratio of about 3:1 to about 5:1. Where present, the alternate calcium source and hydroxide source may be included in the cement compositions in an amount in the range of from about 10% to about 100% by weight of the silica source, for example. In some examples, the alternate calcium source and hydroxide source may be present in an amount ranging between any of and/or including any of about 10%, about 20%, about 40%, about 60%, about 80%, or about 100% by weight of the silica source. One of ordinary skill in the art, with the benefit of this disclosure, would recognize the appropriate amount of alternate calcium source and hydroxide source to include for a chosen application.

The cement compositions may include cement additives that may impart desirable properties to the cementing composition. Examples of such additives include, but are not limited to: weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, dispersants, thixotropic additives, suspending agents, and combinations thereof. One of ordinary skill in the art, with the benefit of this disclosure, would be able to select an appropriate additive for a particular application.

The cement compositions disclosed herein may be used in a variety of subterranean applications, including primary and remedial cementing. The cement compositions may be introduced into a subterranean formation and allowed to set. In primary cementing applications, for example, the cement compositions may be introduced into the annular space between a conduit located in a wellbore and the walls of the wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a microannulus).

The following statements may include some embodiments disclosed herein and should not be read to be limiting to any particular embodiment.

Statement 1. A method for designing a cement composition comprising: providing a target compressive strength and a target composition density; selecting at least one cementitious material from a plurality of cementitious materials; calculating a required amount of water to produce a cement composition with the target composition density, the cement composition comprising the water and the at least one cementitious material; calculating a compressive strength of the cement composition based at least in part on a model of compressive strength; comparing the calculated compressive strength to the target compressive strength; and preparing the cement composition with the calculated compressive strength.

Statement 2. The method of statement 1 further comprising: adjusting a concentration of the at least one cementitious material in the cement composition after the step of comparing; and recalculating the compressive strength of the cement composition.

Statement 3. The method of any of statements 1-2 wherein the step of adjusting includes at least one of: i. increasing a concentration of at least one cementitious material with a relatively higher reactivity index as compared to other cementitious materials if the calculated compressive strength is lower than the target compressive strength, ii. increasing a concentration of at least one cementitious material with a relatively lower specific gravity as compared to other cementitious materials if the calculated compressive strength is lower than the target compressive strength, iii. increasing a concentration of at least one cementitious material with a relatively lower reactivity index as compared to other cementitious materials if the calculated compressive strength is greater than the target compressive strength, or iv. increasing a concentration of at least one cementitious material with a relatively higher specific gravity as compared to other cementitious materials if the calculated compressive strength is greater than the target compressive strength.

Statement 4. The method of any of statements 1-3 wherein the model of compressive strength includes at least one correlation between compressive strength and concentration of cementitious material.

Statement 5. The method of any of statements 1-4 wherein the model of compressive strength has the form of: ln $$(CS) = \ln(A) - 1.5 * \ln(B) * \frac{1 - \frac{\rho_S}{\rho_D}}{\frac{\rho_S}{\rho_W} - 1}$$

where CS is compressive strength, A and B are constants dependent on concentrations of cementitious materials in the cement composition calculated by a regression model, $\rho_s$ is density of the cement composition, $\rho_d$ is density of a dry blend comprising the cementitious materials, and $\rho_w$ is a density of water.

Statement 6. The method of any of statements 1-5 wherein the model of compressive strength has the form of:

$$CS = CS_0 \left(\frac{w}{c_{eff}}\right)^n$$

where: $c_{eff} = c_{cement} + \Sigma a_i c_i$
and where $c_{cement}$ is the mass fraction of Portland cement in a dry blend comprising the cementitious materials, $\alpha_i$ is a reactivity index of component i in a dry blend comprising the cementitious materials, $c_i$ is the mass fraction of cementitious component i in the dry blend, $w/c_{eff}$ is water-to-cement ratio, CS is compressive strength, $CS_0$ is a compressive strength of a Portland cement composition where a water to cement ratio is 1, and n is a constant.

Statement 7. The method of any of statements 1-6 wherein the reactivity index is calculated based at least in part on a correlation comprising constants, wherein the correlation has the general form of: reactivity index=$\Pi f(p_i)$ where $p_i$ is a measurable physicochemical property of the cementitious component.

Statement 8. The method of any of statements 1-7 wherein the model of compressive strength has the form of: CS=$\Sigma CS_i$ where $CS_i$ is a compressive strength contribution of component i in a dry blend comprising the cementitious materials.

Statement 9. A system comprising: a predictive model database comprising at least one model of compressive strength for a plurality of cementitious materials; and a computer system configured to: accept an input of compressive strength and composition density; query the predictive model database and select a model; generate a cement composition, based at least in part on the selected model, compressive strength, and composition density; and display the cement composition to a user.

Statement 10. The system of statement 9 wherein the at least one model of compressive strength correlates concentration of cementitious material to compressive strength.

Statement 11. The system of any of statements 9-10 wherein the at least one model of compressive strength has the form of: ln $$(CS) = \ln(A) - 1.5 * \ln(B) * \frac{1 - \frac{\rho_S}{\rho_D}}{\frac{\rho_S}{\rho_W} - 1}$$

where CS is compressive strength, A and B are constants dependent on concentrations of cementitious materials in the cement composition, $\rho_s$ is density of the cement composition, $\rho_d$ is density of a dry blend comprising the cementitious materials, and $\rho_w$ is a density of water.

Statement 12. The system of any of statements 9-11 wherein A and B are calculated by a regression model.

Statement 13. The system of any of statements 9-12 wherein the at least one model of compressive strength has the form of:

$$CS = CS_0 \left(\frac{w}{c_{eff}}\right)^n$$

where: $c_{eff} = c_{cement} + \Sigma a_i c_i$ and where $c_{cement}$ is the mass fraction of Portland cement in a dry blend comprising the cementitious materials, ai is a reactivity index of component i in a dry blend comprising the cementitious materials, $c_i$ is the mass fraction of cementitious component i in the dry blend, $w/c_{eff}$ is water-to-cement ratio, CS is compressive strength, $CS_0$ is a compressive strength of a Portland cement composition where a water to cement ratio is 1, and n is a constant.

Statement 14. The system of any of statements 9-13 wherein the reactivity index is calculated based at least in part on a correlation comprising constants, wherein the correlation has the general form of: reactivity index=Πf ($p_i$) where $p_i$ is a measurable physicochemical property of the cementitious component.

Statement 15. The system of any of statements 9-14 wherein the at least one model of compressive strength model has the form of: CS=ΣCS$_i$ where CS$_i$ is a compressive strength contribution of component i in a dry blend comprising the cementitious materials.

Statement 16. The system of any of statements 9-15 wherein the computer system is further configured to accept an input of a list of cementitious materials and generate a cement composition from the list of cementitious materials.

Statement 17. The system of any of statements 9-16 further comprising an experimental data database, the experimental data database comprising a plurality of cement compositions, measured compressive strength for the plurality of cement compositions, and corresponding compositional makeup of the plurality of cement compositions, wherein the at least one model of compressive strength includes model parameter inputs, wherein the computer system is further configured to query the experimental data database and generate the model parameter inputs and wherein the model parameter inputs are generated by a regression analysis.

Statement 18. A non-transitory computer readable medium having data stored therein representing software executable by a computer, the software including instructions comprising: instructions to accept a target compressive strength and a target composition density; instructions to select one or more cementitious materials from a list of a plurality of cementitious materials to produce an initial cement composition; instructions to calculate an amount of water required to produce a cement composition with the target composition density, where the cement composition includes the water and the initial cement composition; and instructions to calculate a compressive strength of the cement composition based at least in part on a model of compressive strength where the model of compressive strength is a function of $w/c_{eff}$ and where the cement composition includes the initial cement composition and the amount of water.

Statement 19. The non-transitory computer readable medium of statement 18 wherein the instructions further include: instructions to adjust a concentration of the one or more cementitious materials to produce a modified cement composition;

instructions to calculate an amount of water required to produce a modified cement composition with the target composition density, where the modified cement composition includes the water and the modified cement composition; and instructions to calculate a compressive strength of the modified cement composition based at least in part on the model of compressive strength.

Statement 20. The non-transitory computer readable medium of statement 19 wherein the instructions to adjust the concentration of the one or more cementitious materials include: instructions to increase a concentration of at least one cementitious material with a relatively higher reactivity index if the calculated compressive strength is lower than the target compressive strength; instructions to increase a concentration of at least one cementitious material with a relatively lower specific gravity if the calculated compressive strength is lower than the target compressive strength; instructions to increase a concentration of at least one cementitious material with a relatively lower reactivity index if the calculated compressive strength is greater than the target compressive strength; and instructions to increase a concentration of at least one cementitious material with a relatively higher specific gravity if the calculated compressive strength is greater than the target compressive strength.

EXAMPLE

Figure 6:
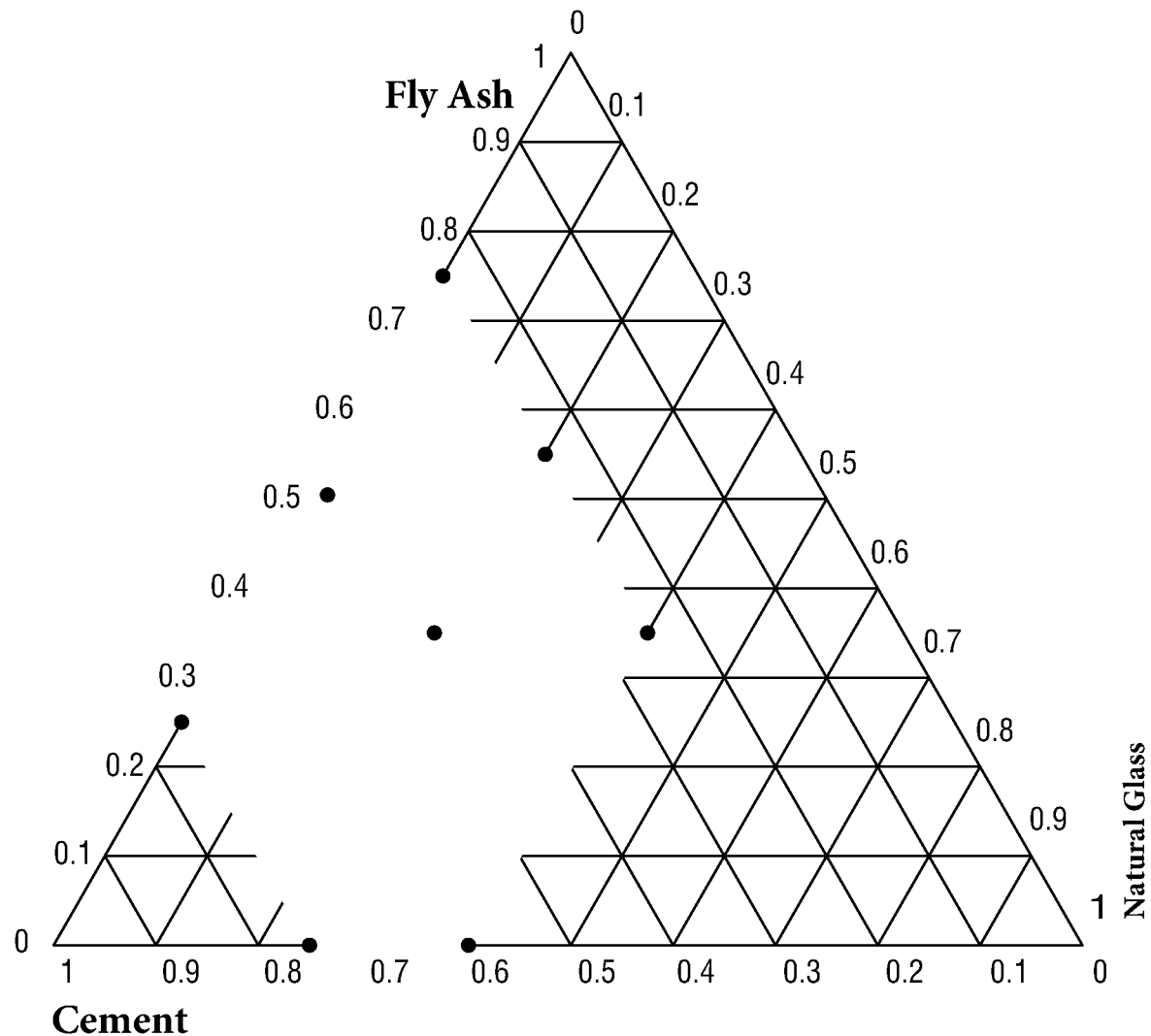
FIG. 6 is a ternary diagram of a cement blend design of experiment.

A design of experiment (DOE) methodology was used to develop a test matrix for a cement blend including at least two of three material components selected from class H Portland cement, natural glass, and class C fly ash. The following restrictions were applied to the DOE: mass fraction of class H Portland cement ($M_c$) ranging from 0.25 to 0.75, mass fraction of natural glass ($M_p$) ranges from 0 to 0.4, mass fraction of fly ash ($M_F$) ranges from 0 to 0.75. Cement blends were prepared according to Table 1. FIG. 6 illustrates a ternary diagram of the cement blends from Table 1.

TABLE 1

Test Matrix Cement Design Blends

| Mix Design # | Mass % | | |
| --- | --- | --- | --- |
| | Class H Cement | Class C Fly Ash | Natural glass |
| 1 | 0.75 | 0 | 0.25 |
| 2 | 0.25 | 0.75 | 0 |
| 3 | 0.47 | 0.35 | 0.18 |
| 4 | 0.5 | 0.5 | 0 |
| 5 | 0.6 | 0 | 0.4 |
| 6 | 0.25 | 0.35 | 0.4 |
| 7 | 0.75 | 0.25 | 0 |
| 8 | 0.25 | 0.55 | 0.2 |

Each of the cement blends from Table 1 were mixed to two different composition densities of 12 lbm/gal (1438 kg/m³) and 14.5 lbm/gal (1737 kg/m³) were prepared resulting in 16 different slurries. All slurries were cured at a constant temperature of 180° F. for seven days and then subjected to uniaxial compressive strength testing. The results of the compressive strength testing are illustrated in Table 2.

TABLE 2

Compressive Strength Test Results

| Mix Design # | Compressive Strength psi (kPa) | |
| --- | --- | --- |
| | 12 lbm/gal | 14.5 lbm/gal |
| 1 | 534 (3682) | 3728 (25705) |
| 2 | 127 (875) | 1957 (13494) |
| 3 | 623 (4295) | 3256 (22451) |
| 4 | 356 (2454) | 2076 (14314) |
| 5 | 978 (6743) | 3994 (27539) |
| 6 | 727 (5012) | 2753 (18982) |
| 7 | 196 (1351) | 1771 (12211) |
| 8 | 258 (1778) | 1797 (12390) |

The test results from Table 2 may be applied to Equation (6) and values of parameters A and B may be calculated for each different mix design. The compressive strength for any composition density may then be predicted. The results of applying Equation (6) are shown in Table 3.

TABLE 3

Derived Model Parameters and Predicted Compressive Strength

| Mix Design # | A | B | Calculated Compressive Strength | |
|---|---|---|---|---|
| | | | ρs = 13 lbm/gal | ρs = 14 lbm/gal |
| 1 | 21661 | 8.36 | 1460 | 2836 |
| 2 | 19740 | 22.28 | 526 | 1339 |
| 3 | 13538 | 6.35 | 1463 | 2573 |
| 4 | 9939 | 7.04 | 888 | 1624 |
| 5 | 13482 | 4.83 | 2021 | 3269 |
| 6 | 7999 | 4.7 | 1443 | 2275 |
| 7 | 13735 | 10.74 | 715 | 1305 |
| 8 | 8872 | 9.3 | 704 | 1368 |

Figure 7:
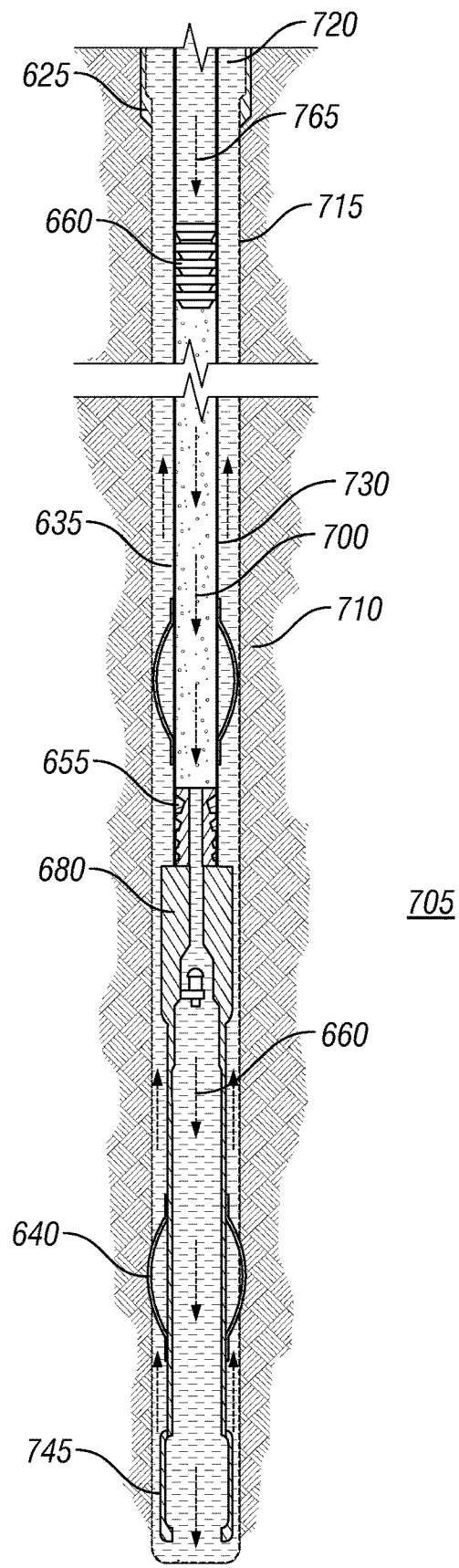
FIG. 7 is a schematic illustration of showing introduction of a cement composition into a wellbore.

Reference is now made to FIG. 7, illustrating use of a cement composition 700 placed into a subterranean formation 705. Cement composition 700 may include any of the components described herein prepared by any cement composition preparation methods. Cement composition 700 may be designed, for example, using reactivity mapping as described herein. As illustrated, a wellbore 710 may be drilled into the subterranean formation 705. While wellbore 710 is shown extending generally vertically into the subterranean formation 705, the principles described herein are also applicable to wellbores that extend at an angle through the subterranean formation 705, such as horizontal and slanted wellbores. Wellbore 710 may include walls 715. In the illustration, a surface casing 720 has been inserted into the wellbore 710. The surface casing 720 may be cemented to the walls 715 of the wellbore 710 by cement sheath 725. In the illustration, one or more additional conduits (e.g., intermediate casing, production casing, liners, etc.), shown here as casing 730 may also be disposed in the wellbore 710. As illustrated, there is a wellbore annulus 735 formed between the casing 730 and the walls 715 of the wellbore 710 and/or the surface casing 720. One or more centralizers 740 may be attached to the casing 730, for example, to centralize the casing 730 in the wellbore 710 prior to and during the cementing operation.

With continued reference to FIG. 7, the cement composition 700 may be pumped down the interior of the casing 730. The cement composition 700 may be allowed to flow down the interior of the casing 730 through the casing shoe 745 at the bottom of the casing 730 and up around the casing 730 into the wellbore annulus 735. The cement composition 700 may be allowed to set in the wellbore annulus 735, for example, to form a cement sheath that supports and positions the casing 730 in the wellbore 710. While not illustrated, other techniques may also be utilized for introduction of the cement composition 700. By way of example, reverse circulation techniques may be used that include introducing the cement composition 700 into the subterranean formation 705 by way of the wellbore annulus 735 instead of through the casing 730. As it is introduced, the cement composition 700 may displace other fluids 550, such as drilling fluids and/or spacer fluids that may be present in the interior of the casing 730 and/or the wellbore annulus 735. While not illustrated, at least a portion of the displaced fluids 550 may exit the wellbore annulus 735 via a flow line and be deposited, for example, in one or more retention pits. A bottom plug 355 may be introduced into the wellbore 710 ahead of the cement composition 700, for example, to separate the cement composition 700 from the fluids 550 that may be inside the casing 730 prior to cementing. After the bottom plug 755 reaches the landing collar 780, a diaphragm or other suitable device should rupture to allow the cement composition 700 through the bottom plug 755. The bottom plug 755 is shown on the landing collar 780. In the illustration, a top plug 760 may be introduced into the wellbore 710 behind the cement composition 700. The top plug 360 may separate the cement composition 700 from a displacement fluid 765 and also push the cement composition 700 through the bottom plug 755.

Figure 8:
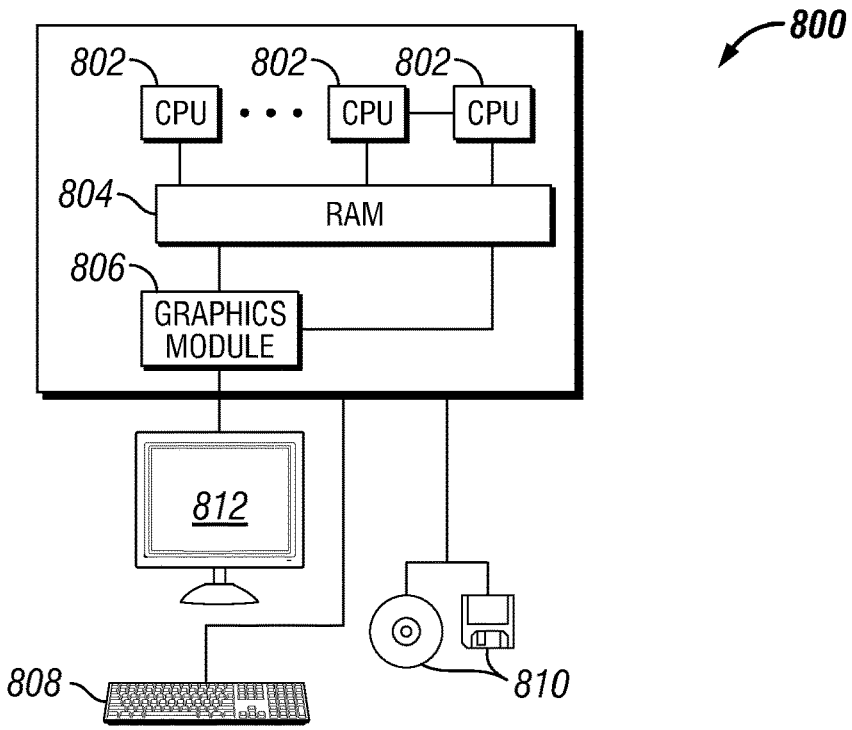
FIG. 8 is a schematic illustration of an example of an information handling system.

FIG. 8 generally illustrates an example of an information handling system 800 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 800 may be a personal computer, a network storage device, or any other suitable device and may vary in size, shape, performance, functionality, and price. In examples, information handling system 100 may be referred to as a supercomputer or a graphics supercomputer.

As illustrated, information handling system 800 may include one or more central processing units (CPU) or processors 802. Information handling system 800 may also include a random-access memory (RAM) 804 that may be accessed by processors 802. It should be noted information handling system 800 may further include hardware or software logic, ROM, and/or any other type of nonvolatile memory. Information handling system 800 may include one or more graphics modules 806 that may access RAM 804. Graphics modules 806 may execute the functions carried out by a Graphics Processing Module (not illustrated), using hardware (such as specialized graphics processors) or a combination of hardware and software. A user input device 808 may allow a user to control and input information to information handling system 800. Additional components of the information handling system 800 may include one or more disk drives, output devices 812, such as a video display, and one or more network ports for communication with external devices as well as a user input device 808 (e.g., keyboard, mouse, etc.). Information handling system 800 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media 810 such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 9:
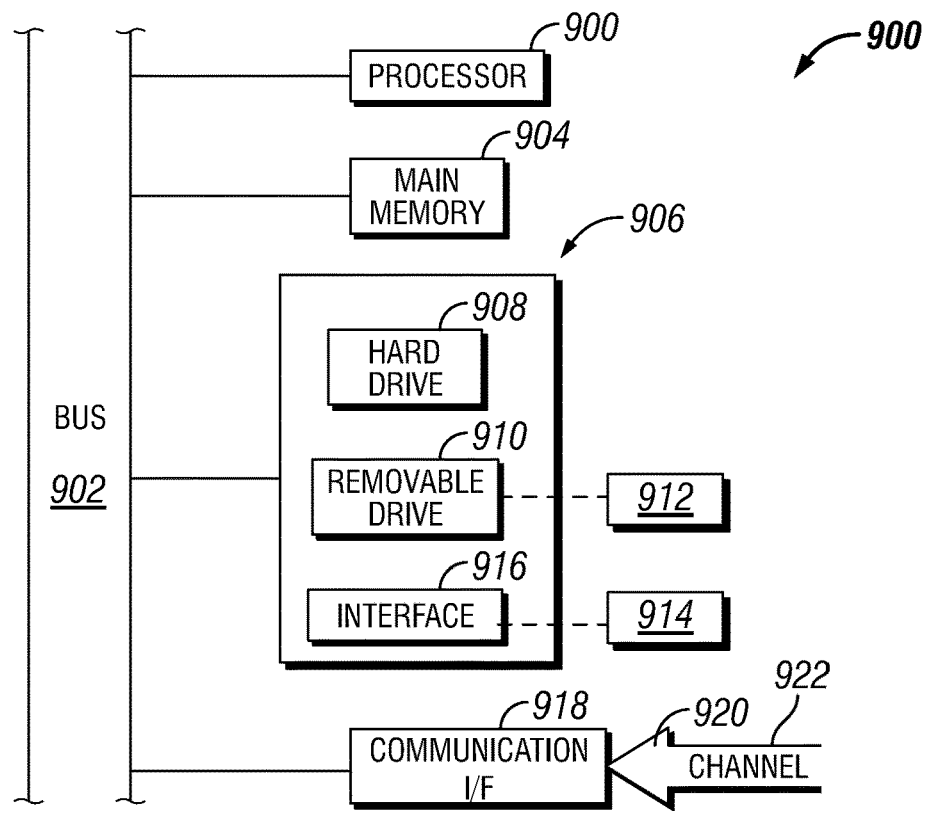
FIG. 9 illustrates additional detail of an information handling system.

FIG. 9 illustrates additional detail of information handling system 800. For example, information handling system 800 may include one or more processors, such as processor 900. Processor 900 may be connected to a communication bus 902. Various software embodiments are described in terms of this exemplary computer system. After reading this description, it will become apparent to a person skilled in the relevant art how to implement the example embodiments using other computer systems and/or computer architectures.

Information handling system 800 may also include a main memory 904, preferably random-access memory (RAM), and may also include a secondary memory 906. Secondary memory 906 may include, for example, a hard disk drive 908 and/or a removable storage drive 910, representing a floppy disk drive, a magnetic tape drive, an optical disk drive, etc. Removable storage drive 910 may read from and/or writes to a removable storage unit 912 in any suitable manner. Removable storage unit 912, represents a floppy disk, magnetic tape, optical disk, etc. which is read by and written to by removable storage drive 910. As will be appreciated, removable storage unit 912 includes a computer usable storage medium having stored therein computer software and/or data.

In alternative embodiments, secondary memory 906 may include other operations for allowing computer programs or other instructions to be loaded into information handling system 800. For example, a removable storage unit 914 and an interface 916. Examples of such may include a program cartridge and cartridge interface (such as that found in video game devices), a removable memory chip (such as an EPROM, or PROM) and associated socket, and other removable storage units 914 and interfaces 916 which may allow software and data to be transferred from removable storage unit 914 to information handling system 800.

In examples, information handling system 800 may also include a communications interface 918. Communications interface 918 may allow software and data to be transferred between information handling system 800 and external devices. Examples of communications interface 918 may include a modem, a network interface (such as an Ethernet card), a communications port, a PCMCIA slot and card, etc. Software and data transferred via communications interface 918 are in the form of signals 920 that may be electronic, electromagnetic, optical or other signals capable of being received by communications interface 918. Signals 920 may be provided to communications interface via a channel 922. Channel 922 carries signals 920 and may be implemented using wire or cable, fiber optics, a phone line, a cellular phone link, an RF link and/or any other suitable communications channels. For example, information handling system 800 includes at least one memory 904 operable to store computer-executable instructions, at least one communications interface 902, 918 to access the at least one memory 904; and at least one processor 900 configured to access the at least one memory 904 via the at least one communications interface 902, 918 and execute computer-executable instructions.

In this document, the terms "computer program medium" and "computer usable medium" are used to generally refer to media such as removable storage unit 912, a hard disk installed in hard disk drive 908, and signals 920. These computer program products may provide software to computer system 800.

Computer programs (also called computer control logic) may be stored in main memory 904 and/or secondary memory 906. Computer programs may also be received via communications interface 918. Such computer programs, when executed, enable information handling system 800 to perform the features of the example embodiments as discussed herein. In particular, the computer programs, when executed, enable processor 900 to perform the features of the example embodiments. Accordingly, such computer programs represent controllers of information handling system 800.

In examples with software implementation, the software may be stored in a computer program product and loaded into information handling system 800 using removable storage drive 910, hard disk drive 908 or communications interface 918. The control logic (software), when executed by processor 900, causes processor 900 to perform the functions of the example embodiments as described herein.

In examples with hardware implementation, hardware components such as application specific integrated circuits (ASICs). Implementation of such a hardware state machine so as to perform the functions described herein will be apparent to persons skilled in the relevant art(s). It should be noted that the disclosure may be implemented at least partially on both hardware and software.

The methods described herein may be carried out, at least in part, using a computer system including a computer-accessible medium, the computer-accessible medium containing a computer program that causes a processor to execute instructions that carry out at least some of the method steps described herein. In general, a computer-accessible medium may include any tangible or non-transitory storage media or memory media such as electronic, magnetic, or optical media—e.g., disk or CD/DVD-ROM coupled to the computer. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM), flash memory, or other volatile memory types. Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for designing a cement composition comprising:
   providing a target compressive strength and a target composition density;
   selecting at least one cementitious material from a plurality of cementitious materials;
   calculating a required amount of water to produce a cement composition with the target composition density, the cement composition comprising the water and the at least one cementitious material;
   calculating a compressive strength of the cement composition based at least in part on a model of compressive strength wherein the model of compressive strength includes a component of reactivity index for each cementitious material in the cement composition;
   comparing the calculated compressive strength to the target compressive strength; and
   preparing the cement composition with the calculated compressive strength.

2. The method of claim 1 further comprising:
   adjusting a concentration of the at least one cementitious material in the cement composition after the step of comparing; and
   recalculating the compressive strength of the cement composition.

3. The method of claim 2 wherein the step of adjusting comprises at least one of:
   i. increasing a concentration of at least one cementitious material with a relatively higher reactivity index as compared to other cementitious materials if the calculated compressive strength is lower than the target compressive strength,
   ii. increasing a concentration of at least one cementitious material with a relatively lower specific gravity as compared to other cementitious materials if the calculated compressive strength is lower than the target compressive strength,
   iii. increasing a concentration of at least one cementitious material with a relatively lower reactivity index as compared to other cementitious materials if the calculated compressive strength is greater than the target compressive strength, or
   iv. increasing a concentration of at least one cementitious material with a relatively higher specific gravity as compared to other cementitious materials if the calculated compressive strength is greater than the target compressive strength.

4. The method of claim 1 wherein the model of compressive strength comprises at least one correlation between compressive strength and concentration of cementitious material.

5. The method of claim 1 wherein the model of compressive strength comprises a model with the form of:

$$\ln(CS) = \ln(A) - 1.5 * \ln(B) * \frac{1 - \frac{\rho_S}{\rho_D}}{\frac{\rho_S}{\rho_W} - 1}$$

where CS is compressive strength, A and B are constants dependent on concentrations of cementitious materials in the cement composition calculated by a regression model, $\rho_s$ is density of the cement composition, $\rho_d$ is density of a dry blend comprising the cementitious materials, and $\rho_w$ is a density of water.

6. The method of claim 1 wherein the model of compressive strength comprises a model with the form of:
where:

$$CS = CS_0 \left( \frac{w}{c_{\mathit{eff}}} \right)^n$$

where: $c_{\mathit{eff}} = c_{cement} + \Sigma\, \alpha_i c_i$ and where $c_{cement}$ is the mass fraction of Portland cement in a dry blend comprising the cementitious materials, $\alpha_i$ is a reactivity index of component i in a dry blend comprising the cementitious materials, $c_i$ is the mass fraction of cementitious component i in the dry blend, $w/c_{\mathit{eff}}$ is water-to-cement ratio, CS is compressive strength, $CS_0$ is a compressive strength of a Portland cement composition where a water to cement ratio is 1, and n is a constant.

7. The method of claim 6 wherein the reactivity index is calculated based at least in part on a correlation comprising constants, wherein the correlation has the general form of:

reactivity index=$\Pi f(p_i)$ where $p_i$ is a measurable physicochemical property of the cementitious component.

8. The method of claim 1 wherein the model of compressive strength comprises a model with the form of:

$$CS=\Sigma CS_i;$$

where $CS_i$ is a compressive strength contribution of component I in a dry blend comprising the cementitious materials.

9. A system comprising:
a predictive model database comprising at least one model of compressive strength for a plurality of cementitious materials wherein the model of compressive strength includes a component of reactivity index for each cementitious material; and
a computer system configured to:
  accept an input of compressive strength and composition density;
  query the predictive model database and select a model;
  generate a cement composition, based at least in part on the selected model, compressive strength, and composition density; and
  display the cement composition to a user.

10. The system of claim 9 wherein the at least one model of compressive strength correlates concentration of cementitious material to compressive strength.

11. The system of claim 9 wherein the at least one model of compressive strength comprises a model with the form of:

$$\ln(CS) = \ln(A) - 1.5 * \ln(B) * \frac{1 - \frac{\rho_S}{\rho_D}}{\frac{\rho_S}{\rho_W} - 1}$$

where CS is compressive strength, A and B are constants dependent on concentrations of cementitious materials in the cement composition, $\rho_s$ is density of the cement composition, $\rho_d$ is density of a dry blend comprising the cementitious materials, and $\rho_w$ is a density of water.

12. The system of claim 11 wherein A and B are calculated by a regression model.

13. The system of claim 9 wherein the at least one model of compressive strength comprises a model with the form of: where $$CS = CS_0 \left(\frac{w}{c_{eff}}\right)^n$$

where: $c_{eff} = c_{cement} + \Sigma \, \alpha_i c_i$ and where $c_{cement}$ is the mass fraction of Portland cement in a dry blend comprising the cementitious materials, $\alpha_i$ is a reactivity index of component i in a dry blend comprising the cementitious materials, $c_i$ is the mass fraction of cementitious component i in the dry blend, $w/c_{eff}$ is water-to-cement ratio, CS is compressive strength, $CS_0$ is a compressive strength of a Portland cement composition where a water to cement ratio is 1, and n is a constant.

14. The system of claim 13 wherein the reactivity index is calculated based at least in part on a correlation comprising constants, wherein the correlation has the general form of:

$$\text{reactivity index} = \Pi f(p_i)$$

where $p_i$ is a measurable physicochemical property of the cementitious component.

15. The system of claim 9 wherein the at least one model of compressive strength model comprises a model with the form of:

$$CS=\Sigma CS_i$$

where $CS_i$ is a compressive strength contribution of component i in a dry blend comprising the cementitious materials.

16. The system of claim 9 wherein the computer system is further configured to accept an input of a list of cementitious materials and generate a cement composition from the list of cementitious materials.

17. The system of claim 9 further comprising an experimental data database, the experimental data database comprising a plurality of cement compositions, measured compressive strength for the plurality of cement compositions, and corresponding compositional makeup of the plurality of cement compositions, wherein the at least one model of compressive strength comprises model parameter inputs, wherein the computer system is further configured to query the experimental data database and generate the model parameter inputs and wherein the model parameter inputs are generated by a regression analysis.

18. A method for designing a cement composition comprising:
providing one or more model parameters of a multilinear regression model;
providing a reactivity index based on one or more measurements of at least one physicochemical property of each of one or more cementitious components;
calculating an overall chemical reactivity for a combination of the one or more cementitious components based, at least in part, on the reactivity index and the one or more model parameters;
calculating both a density and a specific surface area of the combination using any selected from: a linear summation and a nonlinear summation;
predicting one or more properties of the cement composition based, at least in part, on the overall chemical reactivity, the density, and the specific surface area; and
preparing the cement composition.

19. The method of claim 18 further comprising:
specifying a target property; and
determining a formulation for the cement composition based, at least in part, on the specification of the target property.

20. The method of claim 19, wherein the target property comprises at least one target property selected from the group consisting of: compressive strength, tensile strength, Young's modulus of elasticity, and any combination thereof.

* * * * *